US008294660B2

(12) United States Patent
Kang et al.

(10) Patent No.: US 8,294,660 B2
(45) Date of Patent: Oct. 23, 2012

(54) BLACKLIGHT UNIT AND DISPLAY DEVICE INCLUDING THE SAME

(75) Inventors: Eui-Jeong Kang, Asan-si (KR); Gi-Cherl Kim, Yongin-si (KR); Byung-Choon Yang, Seoul (KR); Se-Ki Park, Suwon-si (KR); Byoung-Dae Ye, Yongin-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 1119 days.

(21) Appl. No.: 12/182,761

(22) Filed: Jul. 30, 2008

(65) Prior Publication Data

US 2009/0184660 A1 Jul. 23, 2009

(30) Foreign Application Priority Data

Jan. 21, 2008 (KR) ........................ 10-2008-0006046

(51) Int. Cl.
*G09G 3/36* (2006.01)
*G02F 1/1335* (2006.01)

(52) U.S. Cl. .......................................... 345/102; 349/69

(58) Field of Classification Search .................. 345/102; 349/61, 69, 70

See application file for complete search history.

(56) References Cited

U.S. PATENT DOCUMENTS

| | | | | |
|---|---|---|---|---|
| 2007/0152926 | A1 * | 7/2007 | Kwon | 345/82 |
| 2007/0291198 | A1 * | 12/2007 | Shen | 349/69 |
| 2008/0036940 | A1 * | 2/2008 | Song et al. | 349/61 |
| 2009/0021496 | A1 * | 1/2009 | Silzars | 345/204 |

FOREIGN PATENT DOCUMENTS

| | | |
|---|---|---|
| JP | 5-053517 | 3/1993 |
| KR | 1020050027190 | 3/2005 |
| KR | 1020060092404 | 8/2006 |

OTHER PUBLICATIONS

English Abstract for Publication No. 1991-240367.
English Abstract for Publication No. 1020050027190.
English Abstract for Publication No. 1020060092404.

* cited by examiner

*Primary Examiner* — Bipin Shalwala
*Assistant Examiner* — Steven Holton
(74) *Attorney, Agent, or Firm* — F. Chau & Associates, LLC

(57) ABSTRACT

A backlight unit and a display device having a backlight unit are disclosed. The backlight unit includes an LED substrate,. The LED substrate includes a plurality of emission regions. An LED is provided in each emission region. An LED driver drives the LED. An LED controller supplies a dimming control signal to the LED driver. The LED controller is provided on a driving board. A first connection unit is provided in the LED substrate. A second connection unit is provided in the driving board. The second connection unit is capable of coupling with the first connection unit.

16 Claims, 5 Drawing Sheets

BLACKLIGHT UNIT AND DISPLAY DEVICE INCLUDING THE SAME

CROSS-REFERENCE TO RELATED APPLICATION

This application claims priority to Korean Patent Application No. 10-2008-0006046, filed in the Korean Intellectual Property Office on Jan. 21, 2008, the disclosure of which is incorporated herein by reference in its entirety.

BACKGROUND OF THE INVENTION

1. Technical Field

The present invention relates to a backlight unit, and more particularly, to a backlight unit and a display device including the backlight unit.

2. Discussion of the Related Art

Today, it is desirable for high performance display devices to rapidly display various data, such as images, graphics, text, etc.

Liquid crystal display (LCD) devices have been gaining popularity owing to their compact size and low power consumption. LCD devices are currently used for various electronics, such as electronic watches, calculators, computers, TVs, and so on.

An LCD device includes an LCD panel for displaying images, and a backlight unit for supplying the LCD panel with light.

The LCD panel includes a thin film transistor (TFT) substrate and a color filter substrate. The TFT substrate includes a gate line, a data line, a TFT, and a pixel electrode. The color filter substrate includes a color filter and a common electrode. The LCD panel further includes a liquid crystal layer between the TFT substrate and the color filter substrate. The LCD panel displays images by adjusting light transmittance through liquid crystal molecules of the liquid crystal layer.

The backlight unit may include a fluorescent lamp or light emitting diodes (LED). Backlight units having LEDs may provide excellent color reproduction properties and low power consumption.

In large sized LCD devices, multiple LEDs are arranged under the LCD panel to directly illuminate the LCD panel. To further reduce power consumption, a dimming control method is employed for an LED display, which controls brightness of the LEDs. Such a dimming control method requires a number of cables to supply LED control signals to drivers of the LEDs.

The increase in number of the cables may cause a distortion of the LED control signals. This results in deteriorations of LCD display properties.

SUMMARY OF THE INVENTION

An aspect of the present invention allows an LED driver to be connected to a logic drive without cables to reduce deterioration of LCD display properties.

An exemplary embodiment of the present invention provides a backlight unit including an LED substrate. The LED substrate includes a plurality of emission regions. An LED is provided in each emission region. An LED driver drives the LED. An LED controller supplies a dimming control signal to the LED driver. The LED controller is provided upon a driving board. A first connection unit is provided in the LED substrate. A second connection unit is provided in the driving board and is capable of being coupled with the first connection unit.

The LED substrate may be divided into a plurality of emission region groups, each of the emission region group includes a plurality of emission regions, and the first connection unit is provided in each emission region group.

The first connection unit may be provided in a corner of the emission region group, which is located near a central portion of the LCD substrate. The first connection unit may be through a connector and the second connection unit may be though a connector socket.

Alternatively, the first connection unit may be a connector socket and the second connection unit may be a connector. The LED substrate may be divided into a plurality of LED substrate portions. The first connection unit and at least one LED driver may be provided in each LED substrate portion.

The driving board may include a printed circuit board (PCB), one side of the PCB may be mounted with the LED controller, and the other side of the PCB may be mounted with at least one second connection unit.

At least one LED may be provided in the emission region to emit white, red, green, and/or blue light, and the LEDs of a same color may be connected to each other, and might not be connected to the LEDs of a different color.

An exemplary embodiment of the present invention also provides a display device including a display panel. A panel driver drives the display panel. A timing controller supplies a control signal to the panel driver. A backlight unit supplies light to the display panel. The backlight unit includes an LED substrate. The LED substrate includes a plurality of emission regions. An LED is provided in each emission region. An LED driver drives the LED. An LED controller supplies a dimming control signal to the LED driver. The LED controller is provided upon a driving board. A first connection unit is provided in the LED substrate. A second connection unit is provided in the driving board and is capable of being coupled with the first connection unit.

The LED substrate may be divided into a plurality of emission region groups. Each of the emission region groups includes a plurality of emission regions, and the first connection unit is provided in each emission region group.

The first connection unit may be provided in a corner of the emission region group, which is located near a central portion of the LCD substrate. The first connection unit may be a connector and the second connection unit may be a connector socket. Alternatively, the first connection unit may be a connector and the second connection unit may be a connector socket.

The LED substrate may be divided into a plurality of LED substrate portions and the first connection unit may be provided in each LED substrate portion.

The driving board may include a PCB. One side of the PCB is mounted with the LED controller, and the other side of the PCB is mounted with at least one second connection unit.

At least one LED may be provided in the emission region to emit white, red, green, and/or blue light. The LEDs of a same color are connected to each other and might not be connected to the LEDs of a different color.

An exemplary embodiment of the present invention also provides a display device including a display panel. A panel driver drives the display panel. A timing controller supplies a control signal to the panel driver. The timing controller is mounted upon a control board. An LED substrate is provided on a rear surface of the display panel. The LED substrate includes a plurality of emission regions. An LED is provided in each emission region. An LED driver drives the LED. A first connection unit is provided in the LED substrate. A second connection unit is provided in the control board and is capable of being coupled with the first connection unit. The second connection unit transmits a dimming control signal to the LED substrate.

The timing controller may generate the dimming control signal that may be supplied to the LED driver. The first connection unit may be a connector or a connector socket and the second connection unit may be the other of the connector or the connector socket.

BRIEF DESCRIPTION OF THE DRAWINGS

The above and other features of exemplary embodiments of the present invention will be described with reference to the attached drawings in which.

DETAILED DESCRIPTION OF THE DRAWINGS

Figure 1:
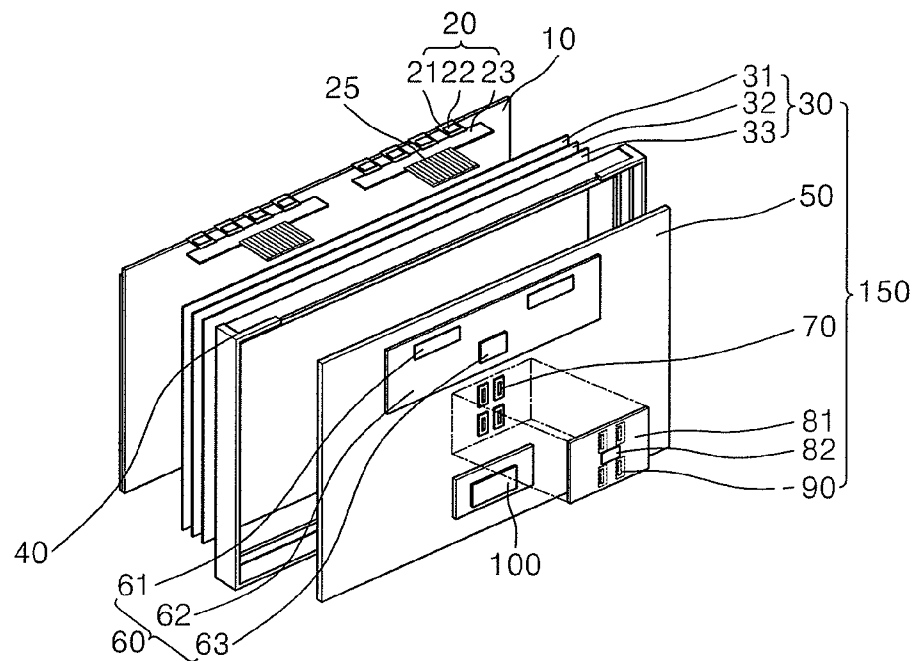
FIG. 1 is an exploded perspective view illustrating an LCD device according to an exemplary embodiment of the present invention.

Exemplary embodiments of the present invention are described more fully hereinafter with reference to the accompanying drawings. This invention may, however, be embodied in many different forms and should not be construed as limited to the embodiments set forth herein. Like reference numerals may refer to like elements throughout.

It will be understood that when an element is referred to as being "on" another element, it can be directly on the other element or intervening elements may be present there between.

Figure 2:
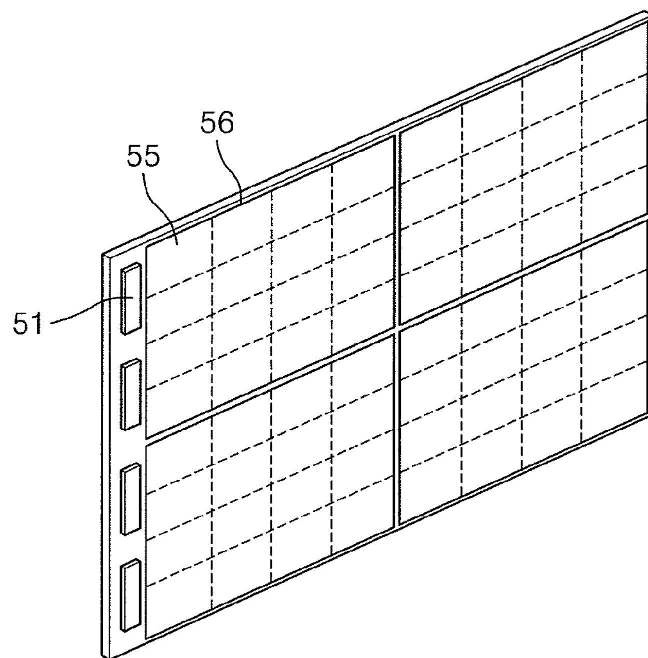
FIG. 2 is a perspective view illustrating the top surface of the LED substrate shown in FIG. 1.

FIG. 1 is an exploded perspective view illustrating an LCD device according to an exemplary embodiment of the present invention, and FIG. 2 is a perspective view illustrating the top surface of an LED substrate shown in FIG. 1.

Figure 3:
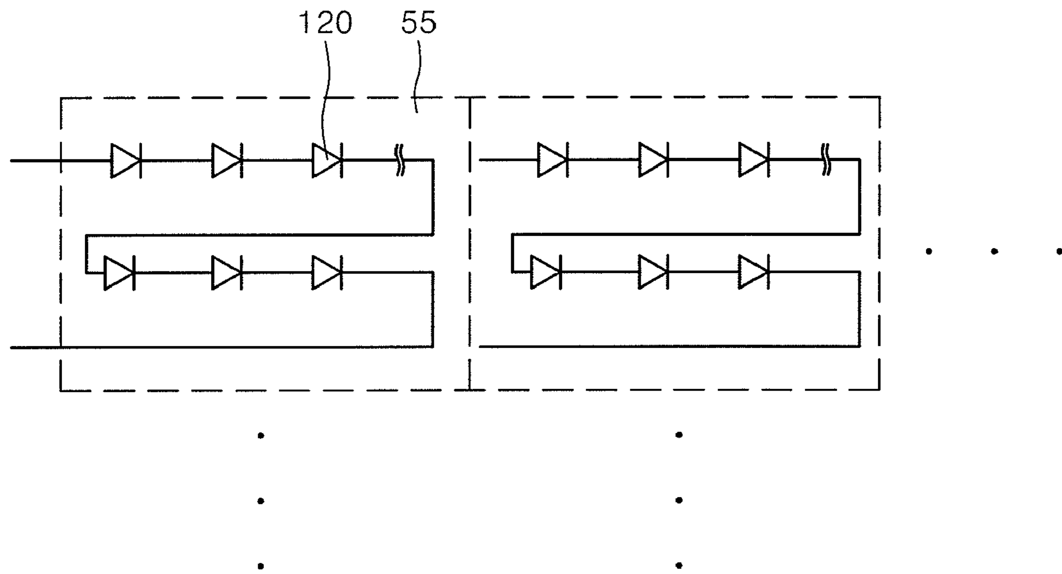
FIG. 3 is a view illustrating how the LEDs are connected to each other on a display region of the LED substrate shown in FIG. 2.

Referring to FIGS. 1, 2, and 3, the LCD device includes an LCD panel 10, a panel driver 20, a panel controller 60, a backlight unit 150, and a power supply 100.

The LCD panel 10 includes a TFT substrate and a color filter substrate that are attached to each other, with a liquid crystal layer disposed therebetween. Liquid crystal cells are arranged on the LCD panel 10. Each of the liquid crystal cells are independently driven by each TFT.

The TFT supplies a pixel signal from a data line to a liquid crystal cell in response to a scan signal supplied from a gate line.

The panel driver 20 may include a gate drive (not shown) and a data driver (22).

The gate driver (not shown) may be integrated at a side of the LCD panel 10. The gate driver may be mounted in a film-type tape carrier package (TCP) that can be attached to a side of the LCD panel 10.

The gate driver sequentially supplies gate on/off voltages to gate lines in response to gate control signals.

The data driver 22 may be mounted in a data film 21 and attached at a side of a data printed circuit board (PCB) 23. The other side of the data film 21 may be attached to a side of the LCD panel 10. The data driver 22 converts pixel data to analogue pixel signals and supplies the converted signals to the data lines.

The data PCB 23 may transmit control signals, power signals, and pixel data from a timing controller 63 and the power supply 100 to the corresponding data driver 22. The data PCB 23 may be connected to a control PCB 62 through a signal transmission film 25.

The panel controller 60 may include a timing controller 63, a control PCB 62, and a connector 61.

The timing controller 63 converts externally supplied pixel data signals and input control signals to generate pixel data signals, gate control signals, and data control signals. The gate control signals are supplied to the gate driver (not shown). The data control signals and pixel data signals are supplied to the data driver 22. The timing controller 63 may be a programmable device.

The control PCB 62 includes the timing controller 63, and may further include a connector 61 thereon. The gate control signals and data control signals can be transmitted through the signal transmission film 25 that is connected to the connector 61.

The power supply 100 may include an AC-DC converter and a DC-DC converter. The AC-DC converter converts alternating current (AC) of particular voltages into direct current (DC) of particular voltages.

The DC-DC converter changes the voltage level of the DC voltages converted by the AC-DC converter. The DC-DC converter changes the voltage level to generate gate on voltages, gate off voltages, analogue driving voltages, and LED driving voltages. The gate on voltages and gate off voltages are supplied to the gate driver, and the analogue driving voltages to the data driver. The LED driving voltages are supplied to the LED driver.

The backlight unit 150 may include an LED 120, a LED substrate 50, an optical sheet 30, a driving board 81, an LED controller 82, a first connection unit 70, and a second connection unit 90.

The LED substrate 50 may be divided into a plurality of emission regions. The LEDs 120 are arranged at each emission region, in which a plurality of signal lines are patterned for the supply of LED driving voltages.

At least one first connection unit 70 may be formed on the rear surface of the LED substrate 50. The first connection unit 70 may include one of a connector and a connector socket.

The optical sheet 30 may include at least one of a diffusion sheet 33, a prism sheet 32, and a protective sheet 31.

The LCD panel 10, the optical sheet 30, and the LED substrate 50 may be received and fixed in a mold frame 40.

The LED controller 82 may include a field programmable gate array (FPGA) that includes a gate logic array arranged regularly and repeatedly.

The FPGA yields a mean brightness value of the display region in the LCD panel 10 from pixel data signals externally supplied during an image frame and generates a dimming control signal DS corresponding to the mean brightness value.

The driving board 81 is a printed circuit board (PCB) that is mounted with the LED controller 82. A plurality of signal lines may be patterned on the driving board 81 to connect the LED controller 82 to the second connection unit 90.

The driving board 81 may include signal lines through which externally supplied pixel data signals may be supplied to the LED controller 82.

The second connection unit 90 may be formed on the rear surface of the driving board 81. The second connection unit 90 is formed to correspond to the first connection unit 70. For example, the second connection unit 90 may be a connector socket corresponding to the first connection unit 70 which is a connector. Alternatively, the second connection unit 90 may be a connector corresponding to the first connection unit 70 which is a connector socket. The second connection unit 90 transmits dimming control signals supplied from the LED controller 82 to the first connection unit 70.

An emission region group 56 includes a plurality of emission regions 55. Each emission region group 56 may include the first connection unit 70. The first connection unit 70 may be arranged around where four emission regions meet one another.

As discussed above, the LED substrate 50 may be divided into a plurality of emission regions 55.

The LED driver 51 may be arranged on a region of the LED substrate 50, which is not occupied by emission regions 55. At least one LED 120 may be mounted in each emission region 55.

The LED 120 may include a white LED for generating white light. The LEDs that are arranged in the same emission region 55 may be serially connected in rows and columns, as shown in FIG. 3.

Multiple LED drivers 51 may be provided along a side of the LED substrate 50, as shown in FIG. 2. The LED drivers 51 may be provided along two opposing sides of the LED substrate 50. The number of the LED drivers 51 may be equal to that of the emission region group 56. Accordingly, the LEDs provided in the emission region group 56 can be driven separately.

Figure 4:
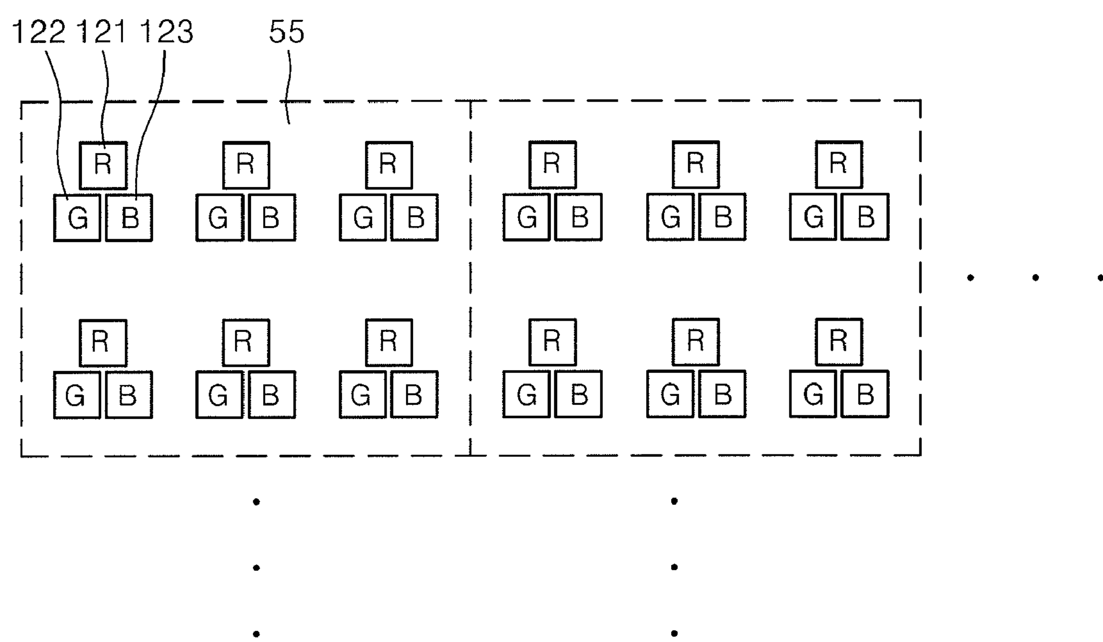
FIG. 4 is a view illustrating LEDs arranged on a display region of the LED substrate shown in FIG. 2.
Figure 5:
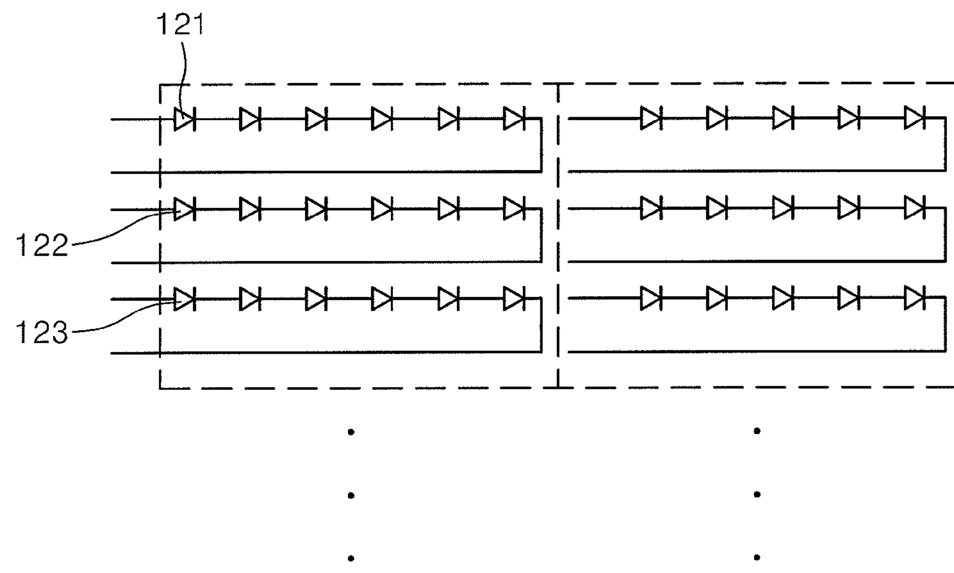
FIG. 5 is a view illustrating how the LEDs are connected to each other on the LED substrate shown in FIG. 4.

FIG. 4 is a view illustrating LEDs arranged on a display region of the LED substrate shown in FIG. 2. FIG. 5 is a view illustrating how the LEDs are connected to each other on the LED substrate shown in FIG. 4.

Referring to FIGS. 4 and 5, the LEDs provided in the emission region 55 may include red, green, and blue LEDs 121, 122, and 123.

More specifically, each emission region 55 may include groups of red, green, and blue LEDs 121, 122, and 123. The red, green, and blue LEDs 121, 122, and 123, respectively, generate red, green, and blue light, and the red, green, and blue light combine to provide white light. One red LED can be serially connected to another red LED, one green LED to another green LED, and one blue LED to another blue LED, without the LEDs of different colors being serially connected to each other.

For example, red LEDs 121 in an emission region 55 can be connected to each other in a serial fashion, as shown in FIG. 4. Like the red LEDs, green LEDs and blue LEDs may also be connected in a serial fashion in an emission region 55 so that one LED of one color is only serially connected to another LED of the same color. A consequence of this configuration is the decrease in number of LEDs used in comparison with a case where each LED is separately driven.

The backlight unit 150 is divided into multiple emission regions 55, with each emission region 55 being driven with a dimming control method, so that each emission region 55 can change the brightness of light illuminating the corresponding one of the LCD panel 10.

Figure 6:
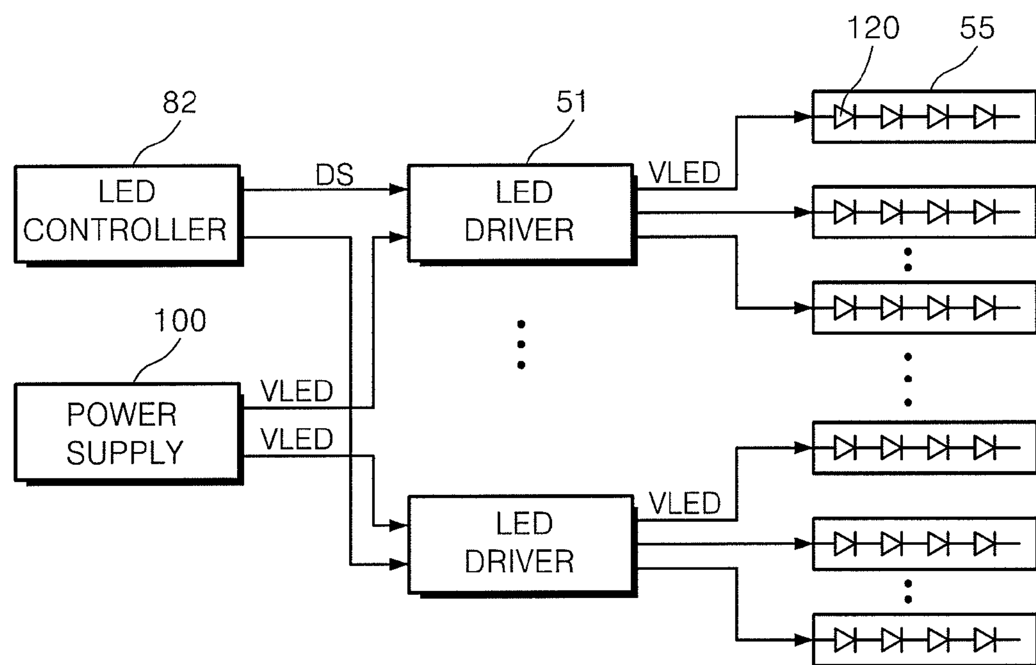
FIG. 6 is a block diagram illustrating a dimming control method for a backlight unit of an LCD device according to an exemplary embodiment of the present invention.

FIG. 6 is a block diagram illustrating a dimming control method for a backlight unit of an LCD device according to an exemplary embodiment of the present invention.

Referring to FIG. 6, the backlight unit 150 sets the brightness of its emission regions 55 by analyzing red, green, and blue pixel data signals externally supplied.

The LED controller 82 generates a dimming control signals DS by analyzing the pixel data signals, which controls the brightness of emission regions 55. The dimming control signal DS is supplied to the LED driver 51. There may be a plurality of LED drivers 51. The dimming control signal DS adjusts the brightness level of each emission region 55.

The LED driver 51 receives a dimming control signal DS from the LED controller 82 and an LED driving voltage VLED from the power supply, and supplies independent LED driving voltages VLED to each emission region 55. The LED driver 51 may adjust the period of time when an LED driving voltage VLED is supplied to the emission region 55 depending on a dimming control signal DS.

Figure 7:
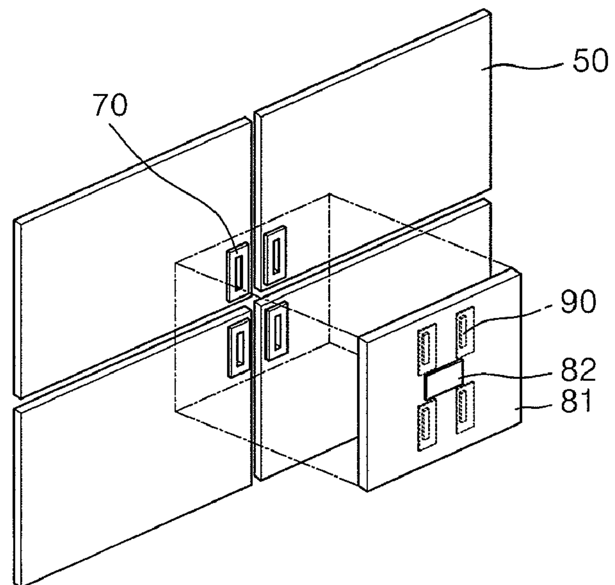
FIG. 7 is a perspective view illustrating an exemplary LED substrate shown in FIG. 1.
Figure 8:
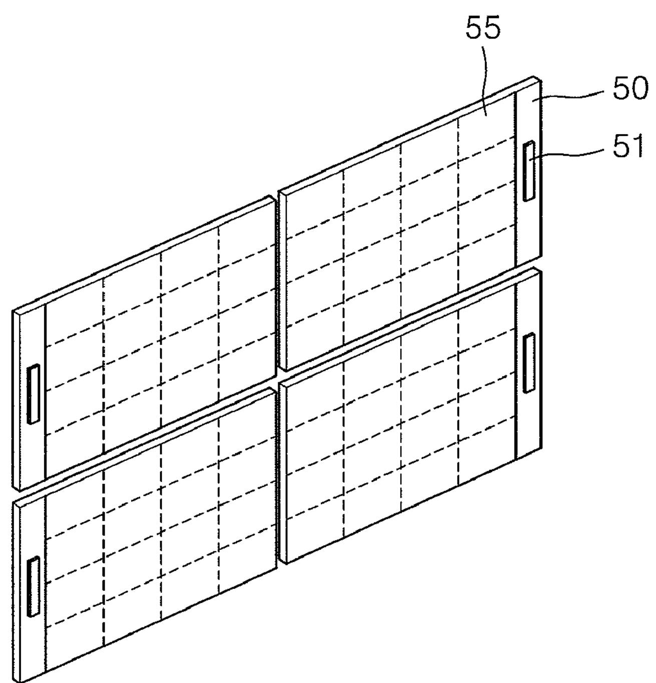
FIG. 8 is a perspective view illustrating the top surface of the LED substrate shown in FIG. 7.

FIG. 7 is a perspective view illustrating an exemplary LED substrate shown in FIG. 1, and FIG. 8 is a perspective view illustrating the top surface of the LED substrate shown in FIG. 7.

Referring to FIGS. 7 and 8, four LED substrates 50 may be provided. The four LED substrates 50 may be adjacent to each other.

Each LED driver 51 may be mounted in each LED substrate 50. A first connection unit 70 may be formed on the LED substrate 50. The first connection unit 70 may be arranged on the rear surface of the LED substrate 50.

The first connection unit 70 may be arranged near one of four corners of the LED substrate 50. For example, the first connection unit 70 may be arranged around the central portion of the LCD panel 10. The first connection unit 70 may include a plurality of pins that are connected to signal lines provided on the LED substrate 50. The first connection unit 70 may include a connector or a connector socket.

The driving board 81 is a printed circuit board (PCB) that is mounted with the LED controller 82. The second connection unit 90 is formed on the rear surface of the driving board PCB 81. The driving board PCB 81 may include a plurality of signal lines that connect the LED controller 82 to the second connection unit 90.

The second connection unit 90 is formed and may be connected to the first connection unit 70. For example, the second connection unit 90 may be a connector socket corresponding to the first connection unit 70 which is a connector. Alternatively, the second connection unit 90 may be a connector corresponding to the first connection unit 70 which is a connector socket. Accordingly, the first connection unit 70 and second connection unit 90 may connect the LED controller 82 to the LED driver 51 without the need for connection cables, thereby making it possible to reduce or prevent the distortion of dimming control signals.

Figure 9:
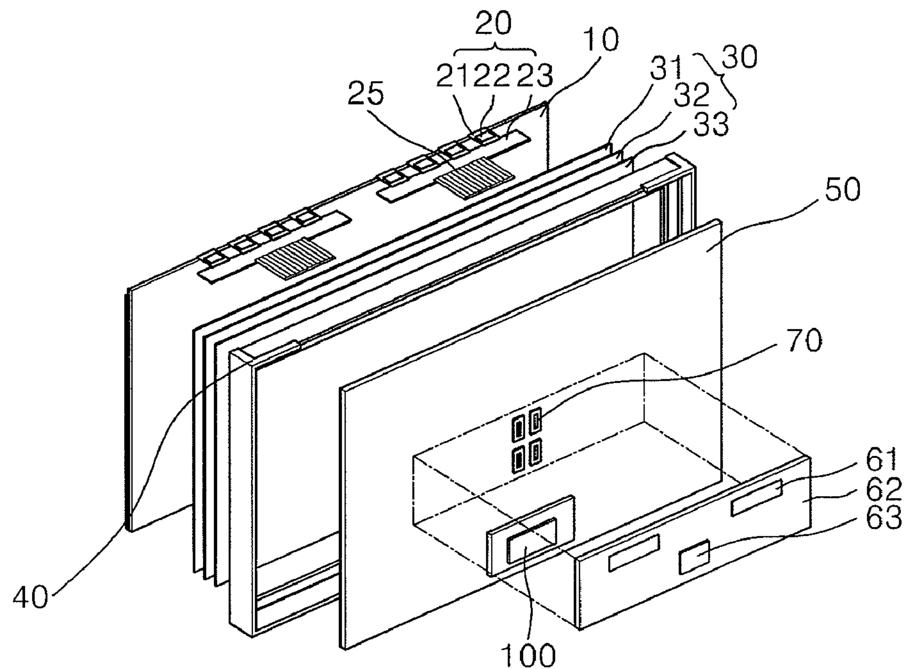
FIG. 9 is an exploded perspective view illustrating an LCD device according to an exemplary embodiment of the present invention.
Figure 10:
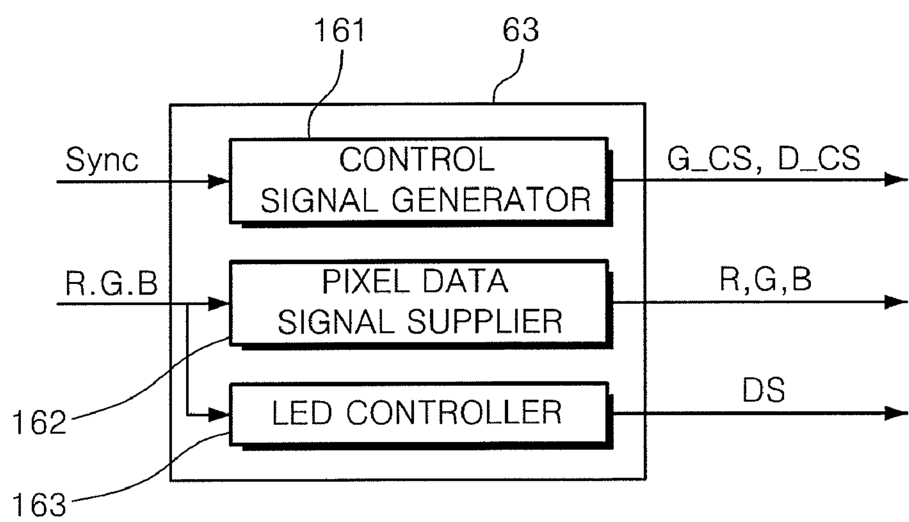
FIG. 10 is a block diagram illustrating a timing controller shown in FIG. 9.

FIG. 9 is an exploded perspective view illustrating an LCD device according to an exemplary embodiment of the present invention. FIG. 10 is a block diagram illustrating a timing controller shown in FIG. 9.

Referring to FIGS. 9 and 10, the LCD device includes an LCD panel 10, a panel driver 20, an LED (not shown), an LED substrate 50, a timing controller 63, an LED driver (not shown), and an LED controller 163. The LED controller 163 may be included in the timing controller 63.

The elements such as the LCD panel 10, panel driver 20, LED 120, and LED substrate 50 shown in FIG. 9 are equal to those of FIG. 1 and FIG. 3, and therefore, their detailed descriptions will not be repeated.

The LED substrate 50 may be divided into a plurality of emission regions 55 as described above with reference to FIG. 2. Each emission region 55 may include at least one LED therein. The LED may include a white LED that emits white light. An LED driver 51 may be mounted in each LED substrate 50, which drives the LEDs in each emission region 55.

White LEDs may be serially connected to each other in an emission region 55 as shown in FIG. 3.

Groups of red, green, and blue LEDs 121, 122, and 123 that emit red, green, and blue light, respectively, may be arranged in each emission region 55 as shown in FIG. 4. In this case, the LEDs of the same color may be serially connected one after another without being connected to the LEDs of the different color.

A plurality of emission regions 55 may be defined in an LED substrate 50. The LED substrate may include a plurality of emission region groups 56, each of which includes multiple emission regions 55. Each emission region group 56 may include the first connection unit 70. In this case, the first connection unit 70 may be arranged near where one emission region group faces another emission region group. The first connection unit 70 may be arranged around where four corners of the four emission region groups gather.

Multiple LED substrates 50 may be provided as shown in FIG. 8. The four LED substrates 50 may be adjacent to each other.

The first connection unit 70 may be arranged near one of four corners of the LED substrate 50. For example, the first connection unit may be arranged around the central portion of the LCD panel 10.

The first connection unit 70 may include one of a connector and a connector socket. The first connection unit 70 is coupled with the second connection unit 90 and transmits dimming control signals supplied from the LED controller 82 to the LED driver 51.

The timing controller 63 may include an LED controller 82. More specifically, the timing controller 63 includes a control signal generator 161 for supplying control signals to the panel driver 20, a pixel data signal supplier 162 for supplying pixel data signals R, G, and B, and the LED controller 163 for generating dimming control signals DS.

The control signal generator 161 generates and supplies gate control signals G_CS and data control signals D_CS to the gate driver (not shown) and the data driver 22.

The pixel data signal 162 supplies pixel data signals R, G, and B from an external component (not shown) to the data driver 22 in synchronization with the gate control signals G_CS and data control signals D_CS.

The LED controller 63 may include a field programmable gate array (FPGA) that includes a gate logic array arranged regularly and repeatedly.

The LED controller 163 may yield a mean brightness value for each display region in the LCD panel 10 from pixel data signals externally supplied during a frame and generates a dimming control signal DS corresponding to the mean brightness value.

The second connection unit 90 is provided on the rear surface of the control PCB 62 on which the timing controller 63 is mounted, which corresponds to the first connection unit 70. The second connection unit 90 may be a connector socket corresponding to the first connection unit 70 which is a connector. Alternatively, the second connection unit 90 may be a connector corresponding to the first connection unit 70 which is a connector socket. The second connection unit 90 may be directly connected to the first connection unit 70 without requiring connection cables to supply dimming control signals DS to the LED driver 51.

As described above, exemplary embodiment of the present invention may reduce or eliminate the need for connection cables to supply LED control signals, thus making it possible to reduce or prevent the distortion of dimming control signals.

Although exemplary embodiments of the present invention has been described, it will be understood by those skilled in the art that a variety of modifications and variations may be made to the described exemplary embodiments without departing from the spirit or scope of the present invention.

What is claimed is:

1. A backlight unit comprising:

a light-emitting diode ("LED") substrate, the LED substrate including a plurality of emission regions;

at least one LEDs provided in each emission region;

at least one LED drivers driving the LEDs;

an LED controller supplying a dimming control signal to the LED drivers;

a driving board on which the LED controller is provided;

a first connection unit provided in the LED substrate; and a second connection unit provided in the driving board, the second connection unit being capable of coupling with the first connection unit, wherein the plurality of emission regions are arranged within a plurality of emission region groups, and the first connection unit is provided in each emission region group, and wherein the first connection unit is provided in a corner of an emission region group of the plurality of emission region groups that is located near a central portion of the LED substrate.

2. The backlight unit of claim 1, wherein the first connection unit is a connector and the second connection unit is a connector socket.

3. The backlight unit of claim 1, wherein the first connection unit is a connector socket and the second connection unit is a connector.

4. The backlight unit of claim 1, wherein the:LED substrate is divided into a plurality of LED substrate portions.

5. The backlight unit of claim 4, wherein the first connection unit and at least one of the LED drivers are provided in each LED substrate portion.

6. The backlight unit of claim 1, wherein the driving board includes a printed circuit board ("PCB"), wherein one side of the PCB is mounted with the LED controller, and another side of the PCB is mounted with at least one second connection unit.

7. The backlight unit of claim 1, wherein at least one of the LEDs are provided in the emission region and emit white, red, green, or blue light, and LEDs of a same color are serially connected to each other and arranged in multiple rows, and are not serially connected to LEDs of a different color.

8. A display device comprising:

a display panel;

a panel driver to drive the display panel;

a timing controller to supply a control signal to the panel driver; and a backlight unit to supply light to the display panel, wherein the backlight unit comprising:

an LED substrate, the LED substrate including a plurality of emission regions;

at least one LEDs provided in each emission region;

at least one LED drivers driving the LEDs;

an LED controller supplying a dimming control signal to the LED drivers;

a driving board on which the LED controller is provided;

a first connection unit provided in the LED substrate; and a second connection unit provided in the driving board, the second connection unit being capable of coupling with the first connection unit, wherein the plurality of emission regions are arranged within a plurality of emission region groups, and the first connection unit is provided in each emission region group, and wherein the first connection unit is provided in a corner of an emission region group of the plurality of emission region groups that is located near a central portion of the LED substrate.

9. The display device of claim 8, wherein the first connection unit is a connector and the second connection unit is a connector socket.

10. The display device of claim 8, wherein the first connection unit is a connector and the second connection unit is a connector socket.

11. The display device of claim 8, wherein the LED substrate is divided into a plurality of LED substrate portions, and the first connection unit is provided in each LED substrate portion.

12. The display device of claim 8, wherein the driving board includes a PCB, wherein one side of the PCB is mounted with the LED controller, and another side of the PCB is mounted with at least one second connection unit.

13. The display device of claim 8, wherein at least one of the LEDs are provided in the emission region and emit white, red, green, or blue light, and LEDs of a same color are serially connected to each other and arranged in multiple rows, and are not serially connected to LEDs of a different color.

14. A display device comprising:

a display panel;

a panel driver to drive the display panel; a timing controller to supply a control signal to the panel driver;

a control board on which the timing controller is mounted;

an LED substrate provided on a rear surface of the display panel, the LED substrate including a plurality of emission regions, at least one LEDs provided in each emission region;

at least one LED drivers driving the LEDs;

a first connection unit provided in the LED substrate; and a second connection unit provided in the control board, the second connection unit being capable of coupling with the first connection unit, wherein the second connection unit transmits a dimming control signal to the LED substrate, wherein the plurality of emission regions are arranged within a plurality of emission region groups, and the first connection unit is provided in each emission region group, and wherein the first connection unit is provided in a corner of an emission region group of the plurality of emission region groups that is located near a central portion of the LED substrate.

15. The display device of claim 14, wherein the timing controller generates the dimming control signal supplied to the LED driver.

16. The display device of claim 15, wherein the first connection unit is one of a connector and a connector socket, and the second connection unit is the other of the connector and the connector socket.

* * * * *

UNITED STATES PATENT AND TRADEMARK OFFICE

CERTIFICATE OF CORRECTION

PATENT NO. : 8,294,660 B2
APPLICATION NO. : 12/182761
DATED : October 23, 2012
INVENTOR(S) : Eui-Jeong Kang et al.

It is certified that error appears in the above-identified patent and that said Letters Patent is hereby corrected as shown below:

Title page, Item (54), and at Column 1, lines 1 and 2, TITLE

"BLACKLIGHT UNIT AND DISPLAY DEVICE INCLUDING THE SAME:"

SHOULD READ:

"BACKLIGHT UNIT AND DISPLAY DEVICE INCLUDING THE SAME"

Signed and Sealed this
Fifteenth Day of January, 2013

David J. Kappos
*Director of the United States Patent and Trademark Office*